Patented June 13, 1944

2,351,359

UNITED STATES PATENT OFFICE 2,351,359

MOTHPROOFING

Henry N. Mitchell, Sanford, Maine, assignor to M. H. Hoepli, New York, N. Y.

No Drawing. Application October 12, 1939, Serial No. 299,099

3 Claims. (Cl. 167—37)

This invention relates to mothproofing and is herein disclosed in some detail as embodied in a preparation adapted to be either incorporated in a commercial dry cleaning solution or to be applied in water solution.

Mothproofing solutions are known which are very effective under certain conditions, but the most effective preparations have been applied in water solution, and are easily washed out in laundering or by being rained upon.

Other useful but less effective preparations, have been applied in solution in organic solvents, but these have been removed when the goods were subjected to the solvents ordinarily used in dry cleaning operations.

One of the apparently most promising of the substances used in attempted mothproofing operations has been salicylic acid, but that often failed to be effective when applied in water solution, perhaps because it deposited at times in peculiar forms. When applied in solution in an organic solvent the salicylic acid was insufficiently held by the fabric to which it was applied, washing out in a heavy rain, and also washing out when repeatedly treated with ordinary dry cleaning solvents.

According to the present invention the foregoing and other difficulties are overcome and a mothproofing material is provided which may be applied either in organic solvent or in water, which is highly effective, which resists both repeated and prolonged washing with water and repeated and prolonged treatments with dry cleaning solvents, and is odorless, non-toxic and may include a mildew inhibitor.

Other features and advantages will hereinafter appear.

The invention as herein disclosed may provide a dry powder adapted to be shipped and stored indefinitely, but a powder which readily dissolves in various organic solvents and which may be caused to form a permanent emulsion with water.

The powder in both cases is completely taken up by wool and completely and permanently mothproofs it, the mothproofing being resistant to severe laundering and severe dry cleaning.

In the form herein disclosed the powder consists largely of salicylic acid and a hard water-insoluble resin or gum, such as kauri, together with a plasticizer for the gum. The plasticizer not only destroys the brittleness of the gum but also preserves the soft or lofty feel of the woolen fabric by destroying the harsh feel otherwise imparted to the fabric by the resin.

In the form disclosed, the powder also includes boric acid which inhibits the growth of certain objectionable fungi such as those that produce mildew.

One useful powder was prepared as follows:

| | Grams |
|---|---|
| Salicylic acid, powdered | 8 |
| Boric acid, powdered | 2 |
| Gum kauri, powdered | 4 |
| Triphenyl phosphate | 1 |

The gum kauri may be replaced by gum sandarac, or copolymerized vinyl chloride and vinyl acetate.

The triphenyl phosphate may be replaced by camphor, tri-para-cresyl-phosphate, or triethanolamine, or castor oil or di-ethyl phthalate or the methyl compound. Camphor, however, is volatile and the other materials are mostly liquid and thus unsatisfactory for users who desire a really dry powder.

To use a dry cleaning solution dissolve about 14 grams of the above mixture in 100 grams of the nearly pure hydroxy compound, ethylene glycol monoethyl ether known as cellosolve, add 1500 cc. of the hydroxy compound isobutyl alcohol, and then add 2400 cc. of the petroleum fraction gasoline-like solvent known as Stoddard solvent.

Saturate the fabric to be treated, remove surplus liquid in a centrifugal extractor and dry.

To treat goods in water solution it is advisable to have present a mild alkali and a wetting agent. The volatile alkali known as morpholine is very satisfactory and the wetting agent known as tergitol penetrant No. 4, a higher secondary alcohol sulphate, is very satisfactory.

The best solution tried was made as follows:

14 grams of the powder were dissolved in 100 cc. cellosolve, 10 cc. of morpholine and 20 cc. tergitol penetrant were added and stirred in. Then 3900 cc. water was stirred in to form a white permanent emulsion.

The fabric to be mothproofed was saturated with the emulsion, the surplus removed in a centrifugal, and then the fabric was dried.

The mothproofed fabrics retained their mothproofed properties during such laundering and cleaning as the fabric itself outlives.

It is found that the gum or resin does not interfere with the mothproofing effect. Instead of Stoddard solvent, it was possible to use carbon tetrachloride, or partly carbon tetrachloride and numerous other organic solvents.

The morpholine was the best alkali for the purpose since it volatilized completely with the drying out of the water and was found not to react chemically with the salicylic acid in the solution used and made a more stable emulsion than other emulsifiers. Other wetting agents than the tergitol were useful.

Having thus described certain embodiments of the invention, what is claimed is:

1. A mothproofing composition adapted to evaporate its water on a woolen and deposit substantially pure salicylic acid as the sole mothproofing agent and also deposit a substantially imperceptible resin and plasticizer, said composition consisting of salicylic acid as a mothproofing agent, and also containing a normally water-insoluble resin, a less but effective quantity of a plasticizer, an organic hydroxy material solvent holding the acid and resin and plasticizer in solution, and several times as much water as solvent holding acid and resin and plasticizer in emulsion.

2. A mothproofing composition including salicylic acid, a water-insoluble resin adapted to dissolve in an organic solvent for the acid and to hold the acid to a fabric, and a less quantity of a plasticizer for the resin, sufficient organic hydroxy compound solvent to dissolve the resin and acid, a mild alkali, and several times as much water holding the acid and resin and plasticizer in emulsion.

3. A mothproofing composition adapted to be applied to a fabric to render it moth-proof when dry, said composition including salicylic acid, a less quantity than salicylic acid of a water-insoluble resin adapted to dissolve in an organic solvent for the acid and to hold the acid to a fabric, and a less quantity of a plasticizer for the resin, sufficient organic hydroxy compound solvent to dissolve the resin and acid and plasticizer, a mild alkali, and several times as much water holding the acid and resin and plasticizer in emulsion.

HENRY N. MITCHELL.